United States Patent [19]

Kamimura et al.

[11] Patent Number: 5,270,551
[45] Date of Patent: Dec. 14, 1993

[54] METHOD OF AND APPARATUS FOR PROTECTING ELECTRONIC CIRCUIT AGAINST RADIATION

[75] Inventors: Hiroshi Kamimura; Motoaki Utamura, both of Hitachi, Japan

[73] Assignee: Hitachi, Ltd., Tokyo, Japan

[21] Appl. No.: 654,549

[22] Filed: Feb. 13, 1991

[30] Foreign Application Priority Data

Feb. 14, 1990 [JP] Japan .................... 2-33061

[51] Int. Cl.$^5$ ............................. B64G 1/54
[52] U.S. Cl. ................... 250/515.1; 250/505.1
[58] Field of Search ............ 250/515.11, 505.1; 174/35 R, 35 MS; 361/424; 257/921

[56] References Cited

U.S. PATENT DOCUMENTS 4,847,506 7/1989 Archer ........................ 250/515.1

OTHER PUBLICATIONS

"Total-Dose Radiation and Annealing Studies" by P. S. Winokur et al., *IEEE Trans. on Nuclear Science*, vol. NS-33 No. 6, 1986, pp. 1343-1351.

"Total Dose Hardness Assurance for Microcircuits for Space Environment" by P. Buchman, *IEEE Trans. on Nuclear Science*, vol. NS-33, No. 6, 1986, pp. 1352-1358.

*Primary Examiner*—Paul M. Dzierzynski
*Assistant Examiner*—Kiet T. Nguyen
*Attorney, Agent, or Firm*—Antonelli, Terry, Stout & Kraus

[57] ABSTRACT

An electronic circuit is protected against radiation when the threshold voltage of a semiconductor element included in the electronic circuit is shifted, in a positive direction, to a predetermined upper limit on the basis of the formation of a trap level at an interface within the semiconductor element, the number of trapped positive charges in the semiconductor element is controlled so that the threshold voltage is shifted, in a negative direction, to a value less than the predetermined upper limit.

36 Claims, 4 Drawing Sheets

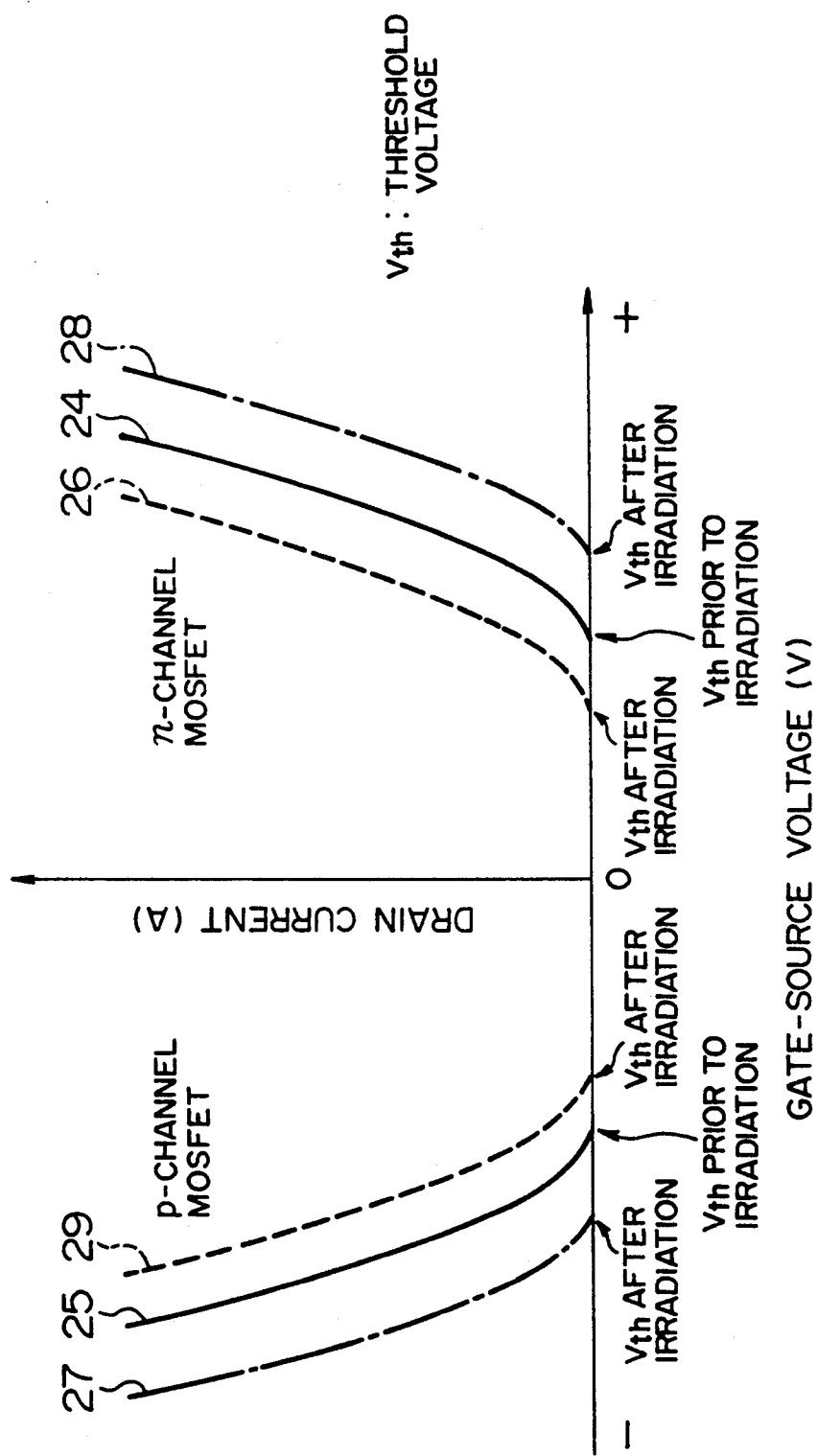

METHOD OF AND APPARATUS FOR PROTECTING ELECTRONIC CIRCUIT AGAINST RADIATION

BACKGROUND OF THE INVENTION

The present invention relates to a method of and an apparatus for suppressing the degradation of a semiconductor element due to irradiation to increase the useful life of an electronic circuit.

It has been well known that a semiconductor element loaded in an artificial satellite or the like is exposed to cosmic rays, and thus is degraded or made defective. Of parts making up the electronic circuit of an artificial satellite, a semiconductor device such as an integraded circuit is most affected by radiation. Of integrated circuits, a CMOS circuit is most suited to be used in space environment because of low power consumptions. Metal oxide semiconductor field effect transistors (MOSFET's) making up the CMOS circuit, however, are readily degraded by radiation.

When an artificial satellite such as a communication satellite has been launched, the maintenance thereof is usually impossible. Accordingly, it is necessary to make the degradation of a semiconductor element due to cosmic rays as small as possible, thereby increasing the life of the electronic circuit. Thus, the electronic circuit of the artificial satellite is surrounded by an aluminum shield which also serves as a heat radiator, to make the total dose given to the electronic circuit as small as possible. The weight of the artificial satellite, however, is limited. Hence, it is impossible to make the thickness of the aluminum shield large without limitation. Accordingly, irradiation experiments on constituent parts of the electronic circuit are done on earth, and an allowable dose rate is determined from the results of the above experiments and the life of the artificial satellite. Then, the thickness of the shield is determined on the basis of the allowable dose rate.

When a device becomes faulty in space environment, it is not easy to repair the device. Accordingly, it is very important that the artificial satellite is provided with means for making the life of the electronic circuit which is surrounded by the shield, as long as possible.

In order to recover from the degradation of characteristics of the FET due to radiation, the following method has been proposed.

The degradation of characteristics of the FET due to irradiation is based upon a change in threshold voltage of the FET (hereinafter referred to as "threshold-voltage shift") and a reduction in channel mobility. Specifically, the threshold voltage shift due to irradiation is large and is considered to be a major cause for the erroneous operation of the FET. It is known that the threshold voltage of the FET can recover (or anneal) at an appropriate temperature. This fact can be used to recover from the degradation of the FET due to radiation. In more detail, the FET is put in high-temperature environment, that is, the FET is kept at a temperature of about 100° C., to recover from the threshold-voltage shift.

The degradation of the FET depending upon a total dose has hitherto been estimated on the basis of irradiation experiments on earth, and the above experiments use a dose rate of $10^2$ to $10^4$ Gy/h, which is far higher than a dose rate of cosmic rays actually incident on the FET (that is, about 1 Gy/h or less). The FET is degraded more rapidly at a high dose rate than at a low dose rate. Accordingly, the results of experiments on earth have been considered to be reliable.

Recently, it has been known that the damage to and the recovery (that is, annealing) of the FET take place at the same time in radiation environment, and thus the degration of the FET depends upon a dose rate even when the FET is irradiated to a predetermined total dose. In more detail, the threshold-voltage of the FET is shifted in a negative direction at high dose rates and in a positive direction at low dose rates (refer to an article entitled "Total-Dose Radiation and Annealing Studies" by P. S. Winokur et. al., *IEEE Trans. on Nuclear Science*, Vol. NS-33, No. 6, 1986, pages 1343 to 1351). The reason for the above is considered as follows. The threshold-voltage shift is based upon ① the negative threshold-voltage shift due to accumulation of trapped positive charges in the gate oxide film of the FET, ② the recovery of the threshold voltage due to the recombination (that is, neutralization) of the trapped position charges with electrons, and ③ the positive threshold-voltage shift due to an increase in the number of trap levels formed in the interface between a silicon layer and a silicon oxide film. The negative threshold-voltage shift due to oxide-trapped charges and the positive threshold-voltage shift due to interface traps are both approximately proportional to a total dose. While, the recovery of the threshold voltage due to recombination is approximately proportional to the logarithm of time. Further, it is known that the speed of the recovery of the threshold voltage due to recombination increases as temperature is higher.

In a case where the dose rate is low, that is, the FET is used in space environment, the negative threshold-voltage shift due to oxide-trapped charges is naturally lessened by the annealing phenomenon due to recombination, and thus the characteristics of the FET are degraded mainly by the positive threshold-voltage shift due to interface traps. Accordingly, a conventional method of annealing the FET at a temperature of about 100° C. to recover the threshold voltage, is not effective for the above case.

It is known that the interface traps can be eliminated at a temperature of 200° C. or more (refer to an article entitled "Total Dose Hardness Assurance for Microcircuits for Space Environment" by P. Buchman, *IEEE Trans. on Nuclear Science*, Vol. NS-33, No. 6, 1986, pages 1352 to 1358). The allowable temperature of ordinary electronic parts is 125°. When the electronic parts are annealed at a temperature of 200° C. or more, the reliability of the parts is degraded. That is, such high-temperature annealing is unpractical.

Further, in order to anneal an electronic circuit at a high temperature, it is necessary to stop the operation of the electronic circuit, and moreover those parts included in the electronic circuit which are excellent in radiation resistance, for example, resistors and capacitors are kept at the high temperature. Thus, there is a fear of degrading the reliability of these parts.

As mentioned above, in the prior art, a major cause for the degradation of a semiconductor element which is used in space environment and is irradiated at a low dose rate, and the reliability of parts of the electronic circuit other than the semiconductor element are not taken into consideration. Accordingly, it is impossible for the semiconductor element to recover from degradation, and there is a fear of degrading the reliability of parts of the electronic circuit other than the semiconductor element.

SUMMARY OF THE INVENTION

It is an object of the present invention to provide a method of and an apparatus for lessening the degradation of a semiconductor element due to radiation such as cosmic rays, to increase the useful life of an electronic circuit or the like.

It is another object of the present invention to provide a method of and an apparatus for increasing the useful life of an electronic circuit without degrading the reliability of parts of the electronic circuit other than a semiconductor element.

In order to attain the above objects, according to the present invention, an electronic circuit is provided with control means for controlling the number of trapped positive charges in a semiconductor element.

The above control means is one of first means for varying the thickness a shield for an electronic circuit to control the dose rate of cosmic rays incident on the electronic circuit, second means for controlling and decreasing the temperature of the electronic circuit, and the combination of the first and second means.

The first means for varying the thickness of the shield reduces the thickness of the shield, when the threshold voltage shift of a field effect transistor (FET) gets near an allowable upper limit. Thus, the dose rate of cosmic rays incident on the FET is increased, and the production speed of trapped positive charge in the FET is increased. That is, the threshold voltage is intentionally shifted in the negative direction, to compensate for the positive threshold-voltage shift due to the interface traps in the FET. As a result, the threshold-voltage shift of the FET is reduced, and the useful life of the electronic circuit is increased. That is, the radiation resistance of the electronic circuit is improved.

Further, the second control means keeps the electronic circuit at a temperature lower than the temperature thereof in prior art. Thus, the annealing speed of trapped positive charges in the FET is reduced. That is, the recovery from the negative threshold-voltage shift is retarded, to compensate for the positive threshold-voltage shift due to the interface traps in the FET. As a result, the threshold-voltage shift of the FET is reduced, and the useful life of the electronic circuit is increased. That is, the radiation resistance of the electronic circuit is improved.

BRIEF DESCRIPTION OF THE DRAWINGS

FIG. 7 is a graph showing relations in each of n-channel and p-channel MOSFET's between a gate-source voltage and a drain current.

DESCRIPTION OF THE PREFERRED EMBODIMENTS

Figure 1:
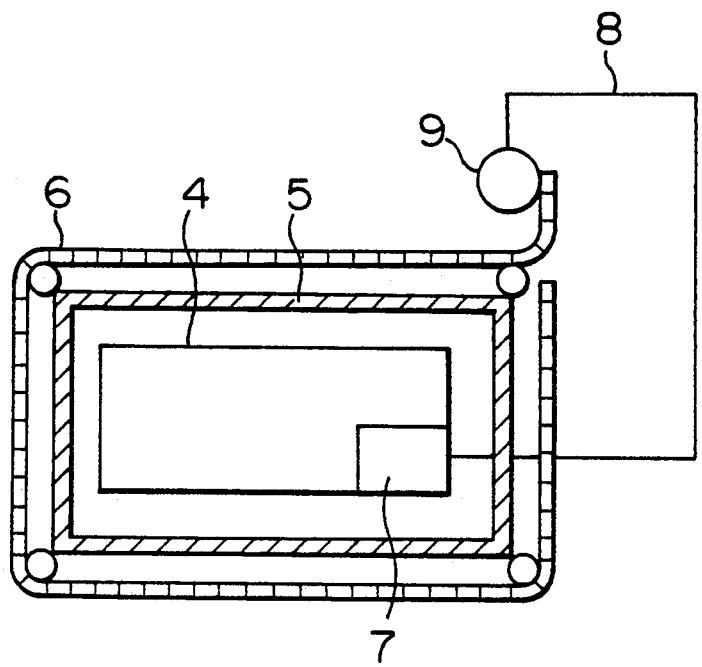
FIG. 1 is a schematic diagram, partially in cross-section, of an embodiment of an apparatus for protecting an electronic circuit against radiation in accordance with the present invention.

Now, explanation will be made of embodiments of the present invention. First, an embodiment of an apparatus for protecting an electronic circuit against radiation in accordance with the present invention, will be explained, with reference to FIGS. 1 to 3. This embodiment includes means for decreasing the thickness of a shield for the electronic circuit controllably, to increase the dose rate of cosmic rays incident on the electronic circuit.

A model for explaining the degradation of FET due to radiation will first be explained. Although a model for explaining the degradation of an MOSFET is not yet established, the degradation of the MOSFET can be yet explained by the following approximate model. That is, the degradation of the MOSFET is expressed by a threshold-voltage shift, and the threshold-voltage shift $\Delta V_T$ is given by the sum of the shift $\Delta V_{ox}$ due to oxide-trapped positive charges and the shift $\Delta V_{it}$ due to interface traps, as indicated by the following equation:

$$\Delta V_T = \Delta V_{ox} = \Delta V_{it} \quad (1)$$

Now, let us suppose that a $\gamma$-ray impulse $Y\gamma\delta(t)$ having a unit dose rate is given to the FET. The shift $\Delta V_{ox}$ due to oxide-trapped positive charges and the shift $\Delta V_{it}$ due to interface traps are given by the following equations:

$$\Delta V_{ox} = A - B \cdot ln(t) \quad (2)$$

$$\Delta V_{it} = C \quad (3)$$

where A indicates the threshold-voltage shift (V/Gy) due to oxide-trapped positive charges generated for a unit dose rate, B is an annealing coefficient (V/Gy·h), and C indicates the threshold-voltage shift (V/Gy) due to interface traps generated for the unit dose rate.

Thus, the impulse response of the threshold-voltage shift of the FET is given by the following equation:

$$\Delta V_{TO}(t) = (A + C) - B \cdot ln(t) \quad (4)$$

Accordingly, the threshold-voltage shift $\Delta V_T$ of the FET irradiated at a dose rate $\gamma(t)$ is given by the convolution integration of the impulse response $\Delta V_{TO}(t)$ and the dose rate $\gamma(t)$, as indicated by the following equation:

$$\Delta V_T(t) = \int_o^t \gamma(\tau) \cdot \Delta V_{TO}(t - \tau) d\tau \quad (5)$$

In a case where the FET is irradiated at a constant dose rate $\gamma$, we can obtain the following equations from the equations (4) and (5).

$$\Delta V_T(t) = \gamma t \{A + C + B - B \cdot \ln(t)\} \text{ for } t \leq t_o \quad (6)$$

$$\Delta V_T(t) = \quad (7)$$

-continued $$\gamma t_o \left[ A + C + B - B \left( \frac{t}{t_o} \cdot \ln \frac{t}{t - t_o} + \ln(t - t_o) \right) \right]$$

for $t > t_o$

The equation (6) indicates $\Delta V_T$ obtained in a period when the FET is being irradiated at the constant dose rate $\gamma$, and the equation (7) shows $\Delta V_T$ obtained after the FET has been irradiated.

That is, according to the above model, when the parameters A, B and C depending upon the manufacturing process and structure of the FET are determined by experiments, the threshold-voltage shift $\Delta V_T$ for a given dose rate can be determined from the equation (5).

In the present embodiment, the following values of the parameters concerning n-channel MOSFET are used which are obtained by irradiation experiments for IC's on the market.

$A + C + B = -1.052 \times 10^{-3}$ $B = -1.0 \times 10^{-4}$

FIG. 1 shows the structure of the present embodiment. Referring to FIG. 1, an electronic circuit 4 is shielded from radiation by a fixed shield 5 and a movable shield 6 disposed outside the fixed shield 5. Further, the electronic circuit 4 includes a control circuit 7 for controlling the movable shield 6, and the control circuit 7 controls a drive mechanism 9 for the movable shield 6 through a control line 8.

Figure 3:
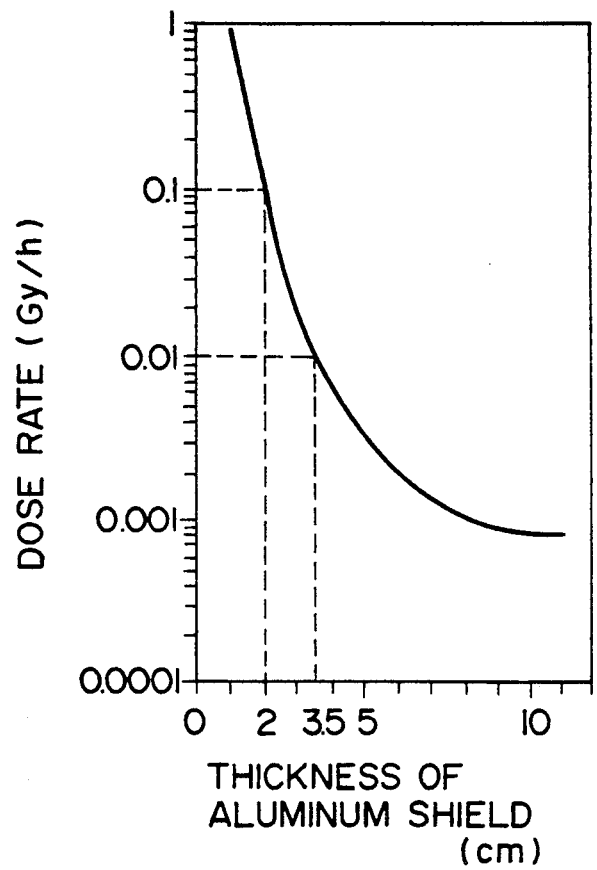
FIG. 3 is a graph showing a relation between the thickness of a shield and a dose rate.

The thickness of each of the shields 5 and 6 is determined in the following manner. FIG. 3 shows a relation between the thickness of an aluminum shield and a dose rate given to the electronic circuit in a case where an artificial satellite is placed on the geostationary orbit. The present embodiment is designed so that the electronic circuit 4 is irradiated with cosmic rays at a dose rate of 0.01 Gy/h. That is, the total thickness of shield means is made equal to 3.5 cm. In a conventional protection apparatus, a single shield having a thickness of 3.5 cm is used. While, in the present embodiment, the total thickness of the fixed shield 5 and the movable shield 6 is made equal to 3.5 cm, and the thickness of the movable shield 6 is about 1.5 cm to make the dose rate for the electronic circuit 4 at a time when the movable shield 6 has been removed, equal to 0.1 Gy/h. That is, the thickness of the fixed shield 5 is about 2 cm.

Figure 2:
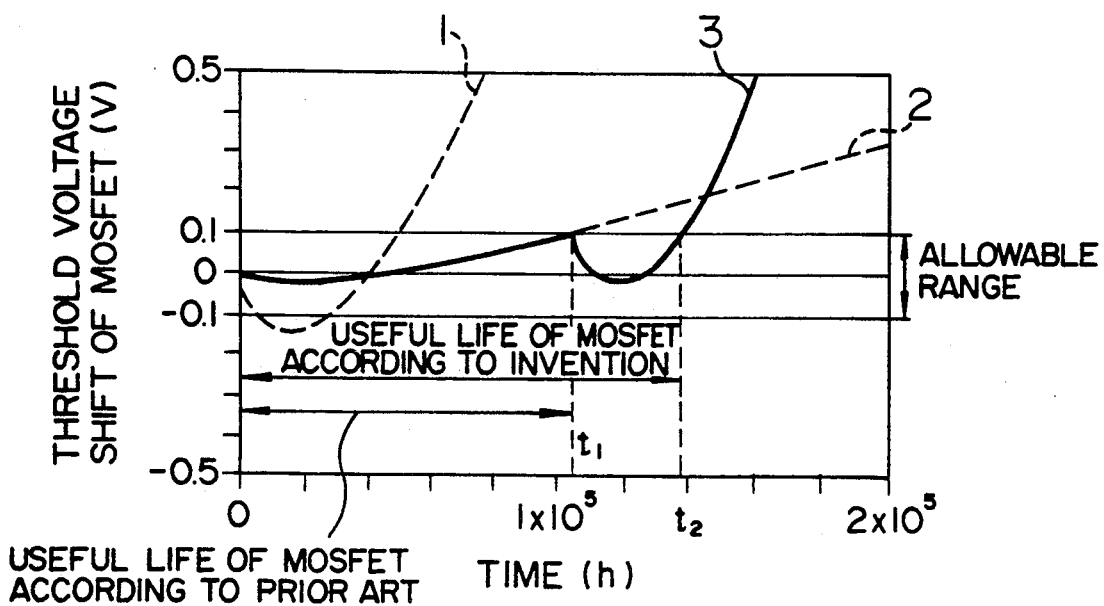
FIG. 2 is a graph showing relations in the embodiment of FIG. 1 between a time and the threshold-voltage shift of an MOSFET.

FIG. 2 shows relations between a time elapsed on the geostationary orbit and the threshold-voltage shift of an FET included in the electronic circuit 4. In FIG. 3, a curve 1 shows the change of the threshold-voltage shift with time for a case where the electronic circuit 4 is irradiated at a dose rate of 0.1 Gy/h, and a curve 2 shows the change of the threshold-voltage shift with time for a case where the electronic circuit 4 is irradiated at a dose rate of 0.01 Gy/h. These curves are obtained by calculation using the above model and parameter values. Although the allowable range of the threshold-voltage shift of the FET depends upon design conditions, a range of $-0.1$ V to $+0.1$ V is considered to be the allowable range. Before the time elapsed on the geostationary orbit reaches $1 \times 10^4$ h, the curve 1 is outside the allowable range. Further, the curve 2 is outside the allowable range when the time elapsed reaches about $1 \times 10^5$ h. It is to be noted that a time $t_1$ in FIG. 2 is about twelve years. A solid curve 3 in FIG. 2 shows the change of the threshold-voltage shift with time according to the present embodiment. As indicated by the solid curve 3, according to the present embodiment, the threshold-voltage shift lies within the allowable range till the time elapsed reaches about $1.4 \times 10^5$ h, that is, till the time elapsed reaches $t_2$ (about 15.7 years). Thus, according to the present embodiment, the useful life of the FET is 3.7 years longer than that according to the conventional apparatus (that is, according to the curve 2).

The operation of the present embodiment will be explained below, with reference to FIGS. 1 and 2. The control circuit 7 begins to count the time elapsed, as soon as an artificial satellite is put on the geostationary orbit after having been launched. When the time elapsed reaches the time $t_1$ which has been previously determined by using the above-mentioned model and the dose rate for the FET, the control circuit 7 controls the drive mechanism 9 through the control line 8 so that the movable shield 6 is moved. In the present embodiment, the movable shield 6 is wound round the drive mechanism 9 to reduce the total thickness of the shield means by 1.5 cm, that is, to enclose the electronic circuit 4 only with the fixed shield 5 having a thickness of about 2 cm.

Thus, the dose rate of cosmic rays incident on the electronic circuit 4 is increased from 0.01 Gy/h to 0.1 Gy/h. When the dose rate increases, the oxide-trapped positive charges in the FET is increased, and thus the threshold voltage of the FET is temporarily shifted in the negative direction. That is, after the time $t_1$, the threshold-voltage shift varies in accordance with a curve similar to the curve 1, and lies in the allowable range till the time elapsed reaches the time $t_2$. In other words, a period, in which the threshold-voltage shift lies in the allowable range, is elongated by a time $t_2 - t_1$.

According to the present embodiment, various parts of the electronic circuit 4 such as a resistor and a capacitor are also exposed to strong radiation. The radiation resistance of these parts, however, is one or two orders of magnitude greater than that of the FET. Accordingly, the present embodiment will produce no adverse effect on the above parts.

In the present embodiment, a time $t_1$ when the movable shield 6 begins to move, is previously determined by calculation. Alternatively, the control circuit 7 may be additionally provided with a circuit for measuring the threshold-voltage shift, to move the movable shield 6 as soon as the measured value of the threshold-voltage shift is put outside the allowable range.

Further, the control circuit 7 may be provided with a sensor for measuring the dose rate of cosmic rays, to calculate a time when the threshold-voltage shift is put outside the allowable range, by using the measured dose rate, and to move the movable shield 6 at the calculated time.

In the present embodiment, the dose rate for the electronic circuit 4 is increased by changing the total thickness of shield means. Alternatively, the above dose rate may be increased by bringing a radiation source close to the electronic circuit 4.

Figure 4:
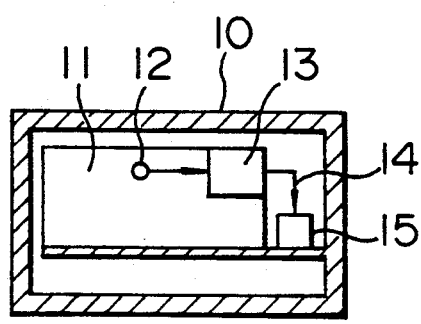
FIG. 4 is a schematic diagram, partially in cross-section, of another embodiment of an apparatus for protecting an electronic circuit against radiation in accordance with the present invention.

Next, explanation will be made of another embodiment of an apparatus for protecting an electronic circuit against radiation in accordance with the present invention, in which embodiment the radiation resistance of an FET is improved by lowering the temperature of the electronic circuit. FIG. 4 shows the structure of the present embodiment. Referring to FIG. 4, an electronic circuit 11 is surrounded with a shield 10 which also serves as a heat radiator. Further, a control circuit 13 is applied with the output signal of a temperature sensor 12 for detecting the temperature of the electronic circuit 11, to control a heating/cooling device 15 through a control line 14.

Figure 5:
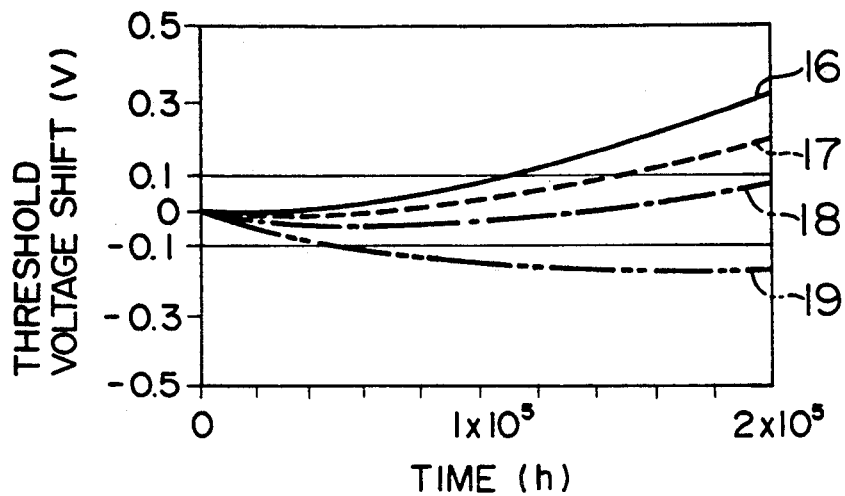
FIG. 5 is a graph showing relations in the embodiment of FIG. 4 between a time and the threshold-voltage shift of an MOSFET.

The operation principle of the present embodiment will be explained below. An FET included in the electronic circuit 11 is the same as that included in the embodiment of FIG. 1. Accordingly, the model and parameters used for the former FET is the same as those used for the latter FET. Further, the dose rate given to the electronic circuit 11 is 0.01 Gy/h. The annealing coefficient of the oxide-trapped positive charge (that is, parameter B) decreases at the temperature of the FET is lower. FIG. 5 shows relations between a time, during which the FET is irradiated at a dose rate of 0.01 Gy/h, and the threshold-voltage shift of the FET. In FIG. 5, a curve 16 indicates the change of the threshold-voltage with time at ordinary temperature (that is, at 20° C.). The curve 16 is equal to the curve 2 of FIG. 2. When the temperature of the FET is lowered, the threshold-voltage shift changes as indicated by curves 17, 18 and 19. In more detail, the curve 17 shows a case where the value of the parameter B is equal to ninety-five hundredth of the value of B at 20° C., the curve 18 shows a case where the value of B is equal to nine tenth of the value of B at 20° C., and the curve 19 shows a case where the value of B is equal to eight tenth of the value of B at 20° C. According to the curve 6, the threshold-voltage shift is put outside an allowable range of $-0.1$ V to $+0.1$ V, when the time elapsed reaches about $1 \times 10^5$ hours According to the curve 17, the threshold-voltage shift is put outside the allowable range when the time elapsed reaches about $1.4 \times 10^5$ hours. According to the curve 18, the threshold-voltage shift lies outside the allowable range when the time elapsed reaches about $2 \times 10^5$ hours. That is, when the temperature of the FET is lowered, the annealing speed is reduced, and thus the recovery from the negative threshold-voltage shift is delayed to compensate for the positive threshold-voltage shift due to interface traps. Accordingly, the threshold-voltage shift of the FET is decreased. In a case where the temperature of the FET is lowered too much, the threshold-voltage shift in the negative direction due to oxide-trapped positive charges is increased, and thus the threshold-voltage shift lies within the allowable range only in a short period, as indicated by the curve 19.

Accordingly, by controlling the temperature of the electronic circuit 11 while taking into consideration the dose rate for the electronic circuit 11 and the model parameters used for the FET, a change in threshold voltage of the FET can be suppressed, and thus the radiation resistance thereof can be improved.

The temperature of the electronic circuit 11 is controlled in a range from several degrees to tens of degrees, though the temperature range depends upon the kind of the FET used. The above range is lower than a temperature of 100° to 200° C. necessary for releasing oxide-trapped positive charges and for eliminating interface traps. Accordingly, the temperature control of the present embodiment will produce no adverse effect on the resistors and capacitors of the electronic circuit 11.

It is needless to say that the embodiment of FIG. 1 may be combined with the embodiment of FIG. 4.

Although explanation has been made of a case where an electronic circuit is put in radiation environment having a constant dose rate, the change of threshold-voltage shift with time can be predicted on the basis of the above-mentioned model, even in a case where the electronic circuit is put in radiation environment in which the dose rate varies with time. That is, the present invention is applicable to such a case.

Figure 6:
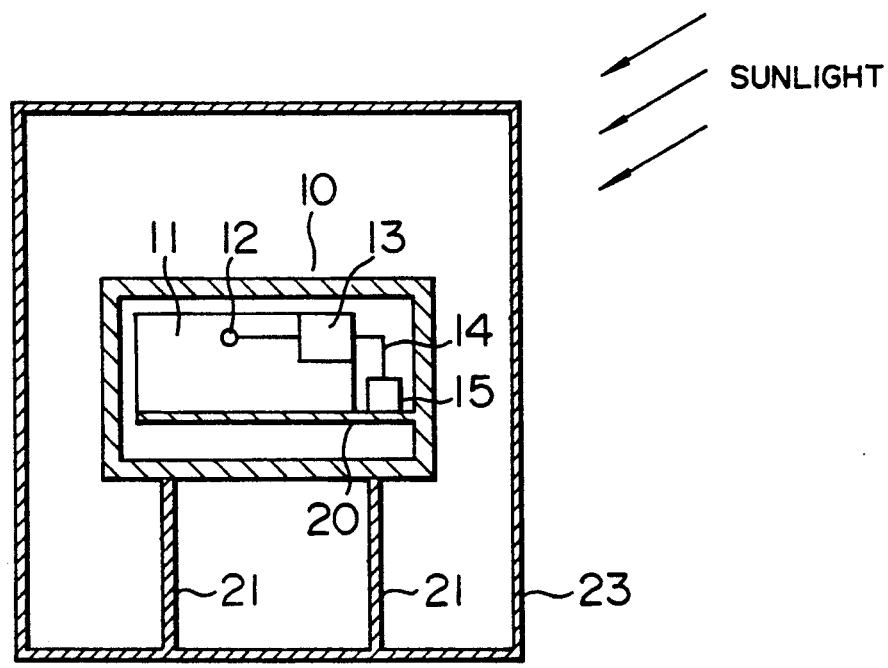
FIG. 6 is a sectional view showing the rough construction of an artificial satellite provided with the embodiment of FIG. 4.

FIG. 6 shows the structure of an artificial satellite provided with the embodiment of FIG. 4. Referring to FIG. 6, the shield 10 is fixed to the vessel 23 of the artificial satellite through supports 21. The heat generated by the electronic circuit 11 is radiated to space through a base 20 connected to the shield 10, the shield 10, the supports 21 and the vessel 23. In contrast with the heat dissipation on earth, the heat dissipation in space environment is based upon only conduction and radiation, and hence can be readily calculated from the heat quantity generated by the electronic circuit 11, the material and shape of a structure made up of the base 20, the shield 10, the supports 21 and the vessel 23, and the quantity of sunlight incident on the artificial satellite. Accordingly, it is possible to design the structure so that the temperature of the electronic circuit 11 corresponds to the curve 18 of FIG. 5. In designing the structure, averaged power consumption of the electronic circuit 11 is used as the design value (that is, heat quantity generated by the electronic circuit 11). The power consumption of the electronic circuit 11, however, is generally dependent upon the operation state thereof. Accordingly, it is preferable to keep the electronic circuit 11 at a predetermined temperature with the aid of a heating/cooling device 15, when the electronic circuit 11 is actually operated. The heating/cooling device 15 is operated as a cooler when the power consumption of the electric circuit 11 is larger than the average value, and is operated as a heater when the power consumption is smaller than the average value. Thus, when the structure is designed so that the averaged temperature of the electronic circuit 11 becomes equal to the predetermined temperature, the heating/cooling device 15 is required to have a capability of controlling only a temperature change due to a variation in operation state of the electronic circuit 11. Accordingly, the embodiment of FIG. 4 is suitable for use in an artificial satellite, in which power consumption is restricted. It is not always required to perform the above temperature control for the whole of the electronic circuit 11, but the temperature control may be carried out only for an integrated circuit including FET's. In this case, the power consumption is further reduced.

In the above embodiments, explanation has been made of a case where an n-channel MOSFET is included in the electronic circuit. The present invention is also applicable to a case where a p-channel MOSFET is included in the electronic circuit. FIG. 7 shows relations in each of the n-channel MOSFET and the p-channel MOSFET between a gate-source voltage and a drain current. In FIG. 7, a curve 24 indicates the drain-current characteristics of an n-channel MOSFET which is not yet irradiated, and a curve 25 indicates the drain-current characteristics of a p-channel MOSFET which is not yet irradiated. The threshold voltage is defined by the gate-source voltage at a time when the drain current begins to flow. The threshold voltage of the n-channel MOSFET is positive, and the threshold voltage of the p-channel MOSFET is negative.

When the characteristics of each of the n-channel MOSFET and the p-channel MOSFET are degraded by irradiation, the threshold voltage of each MOSFET is shifted as follows. That is, in a case where that component of the threshold-voltage shift which is based upon oxide-trapped positive charges, is dominant over all other components of the threshold-voltage shift, the drain-current characteristics of the n-channel MOSFET are indicated by a curve 26 in FIG. 7, and the drain-current characteristics of the p-channel MOSFET are indicated by a curve 27. In both of the n-channel and p-channel MOSFET's, the threshold voltage is shifted in a negative direction. That is, the threshold-voltage shift is negative, independently of the kind of an MOSFET. In a case where that component of the threshold-voltage shift which is based upon interface traps, is dominant over all other components of the threshold-voltage shift, the drain-current characteristics of the n-channel MOSFET are indicated by a curve 28 in FIG. 7, and the drain-current characteristics of the p-channel MOSFET are indicated by a curve 29. That is, the threshold-voltage shift is positive, independently of the kind of an MOSFET.

As is evident from the above, when the degradation of characteristics of an MOSFET is estimated by the threshold-voltage shift, the above embodiments for the n-channel MOSFET are all applicable to the p-channel MOSFET.

As has been explained in the foregoing, according to the present invention, the degradation of an MOSFET due to radiation is greatly lessened, and thus the useful life of an electronic circuit is increased. Further, according to the present invention, there is provided a radiation-proof electronic circuit, in which the reliability of parts of the electronic circuit other than the MOSFET is never degraded.

We claim:

1. An apparatus for protecting an electronic circuit against radiation, comprising means for estimating a threshold voltage change, and means for controlling a threshold voltage to fall in a predetermined range based on an estimation obtained by the estimating means, for controlling the number of trapped positive charges in a semiconductor element, to restrict a change in the positive direction in threshold voltage of the semiconductor element caused by a formation of a trap level at an interface within the semiconductor element due to radiation.

2. An apparatus according to claim 1, wherein the means for controlling the threshold voltage further comprises means for controlling a dose rate of radiation incident on the semiconductor element.

3. An apparatus according to claim 2, wherein the dose rate control means includes means for controlling a thickness of a shield which is used for shielding the semiconductor element from radiation.

4. An apparatus according to claim 2, wherein the dose rate control means includes means for controlling a separation between the semiconductor element and a radiation source.

5. An apparatus according to claim 1, wherein the means for controlling the threshold voltage further comprises means for controlling and reducing the temperature of the semiconductor element.

6. An apparatus according to claim 1, wherein the means for controlling the threshold voltage further comprises means for controlling the dose rate of radiation incident on the semiconductor element, and for controlling and reducing the temperature of the semiconductor element.

7. An artificial satellite comprising said apparatus for protecting an electronic circuit claimed in claim 1.

8. An artificial satellite according to claim 7, further comprising:
cooling means which is a housing of said artificial satellite.

9. An apparatus for protecting an electronic circuit against radiation, comprising means for detecting a threshold voltage change, in a positive direction, and means for controlling the number of trapped positive charges in a semiconductor element by controlling a dose rate of radiation incident on the semiconductor element, to compensate for a change in threshold voltage of the semiconductor element caused by the formation of a trap level at an interface within the semiconductor element due to radiation.

10. An apparatus according to claim 9, wherein said controlling means reduces the temperature of the semiconductor element.

11. An apparatus for protecting an electronic circuit against radiation, comprising means for detecting a temperature of a semiconductor element, means for changing said temperature, and means for controlling the number of trapped positive charges in a semiconductor element by reducing said temperature of the semiconductor element by using the changing means, to compensate for a change in threshold voltage of the semiconductor element caused by the formation of a trap level at an interface within the semiconductor element due to radiation.

12. An apparatus according to claim 11, wherein the controlling means effects said temperature of the semiconductor element at the lowest temperature within an allowable range of said threshold voltage.

13. An apparatus for protecting an electronic circuit against radiation, comprising means for estimating a threshold voltage change, and means for controlling the number of trapped positive charges in a semiconductor element by controlling the dose rate of radiation incident on the semiconductor element and by reducing the temperature of the semiconductor element, to compensate for a change in a threshold voltage of the semiconductor element caused by a formation of a trap level at an interface within the semiconductor element due to radiation.

14. An apparatus for protecting an electronic circuit against radiation, comprising:
means for detecting that the threshold voltage of a semiconductor element is shifted, in a positive direction, to a predetermined upper limit on the basis of the formation of a trap level at an interface within the semiconductor element due to radiation; and
means for controlling the number of trapped positive charges in the semiconductor element, upon detecting the arrival of the threshold voltage to the predetermined upper limit so that the threshold voltage is shifted, in a negative direction, to a value less than the predetermined upper limit.

15. An apparatus according to claim 14, wherein the trapped positive charge control means is means for controlling and decreasing the thickness of a shield which is used for shielding the semiconductor element from radiation.

16. An apparatus according to claim 14, wherein the detecting means further comprises means for directly detecting said threshold voltage.

17. An apparatus according to claim 14, wherein the detecting means further comprises means for previously calculating a time to reach said predetermined upper limit as an estimated value.

18. A method of protecting an electronic circuit against radiation, comprising a step of controlling the number of trapped positive charges in a semiconductor element, to compensate for a change in a threshold voltage of the semiconductor element caused by a formation of a trap level at an interface within the semiconductor element due to radiation.

19. A method according to claim 18, wherein the step of controlling the number of trapped positive charges is a step of controlling the dose rate of radiation incident on the semiconductor element.

20. A method according to claim 19, wherein the step of controlling the dose rate is a step of controlling the thickness of a shield for shielding the semiconductor element from radiation.

21. A method according to claim 19, wherein the step of controlling the dose rate is a step of controlling the distance between the semiconductor element and a radiation source.

22. A method according to claim 18, wherein the step of controlling the number of trapped positive charges is a step of controlling and reducing the temperature of the semiconductor element.

23. A method according to claim 18, wherein the step of controlling the number of trapped positive charges is a step of controlling the dose rate of radiation incident on the semiconductor element, and of controlling and reducing the temperature of the semiconductor element.

24. A method according to claim 18, further comprising the steps of:
previously estimating a change in the threshold voltage; and
controlling the threshold voltage to fall in an allowable range based on an estimation.

25. A method of protecting an electronic circuit against radiation, comprising a step of controlling a number of trapped positive charges in a semiconductor element by controlling the dose rate of radiation incident on the semiconductor element, to compensate for a change in a threshold voltage of the semiconductor element caused by a formation of a trap level at an interface within the semiconductor element due to radiation.

26. A method according to claim 27, further comprising the step of:
detecting a shift in a threshold voltage of a semiconductor element, in a positive direction, to a predetermined upper limit on the basis of a formation of a tap level at an interface within the semiconductor element due to radiation.

27. A method according to claim 25, wherein the number of trapped positive charges ar controlled by reducing the temperature of the semiconductor element.

28. A method of protecting an electronic circuit against radiation, comprising a step of controlling the number of trapped positive charges in a semiconductor element by controlling and reducing a temperature of the semiconductor element, to compensate for a change in a threshold voltage of the semiconductor element caused by a formation of a trap level at an interface within the semiconductor element due to radiation.

29. A method according to claim 28, further comprising the steps of:
detecting the temperature of the semiconductor element;
changing said temperature; and
controlling the number of trapped positive charges by using the changing step.

30. A method according to claim 29, wherein the controlling step effects the temperature of the semiconductor element at the lowest temperature within an allowable range of said threshold voltage.

31. A method of protecting an electronic circuit against radiation, comprising a step of controlling a number of trapped positive charges in a semiconductor element by controlling a dose rate of radiation incident on the semiconductor element and by controlling and reducing the temperature of the semiconductor element, to compensate for a change in a threshold voltage of the semiconductor element caused by a formation of a trap level at an interface within the semiconductor element due to radiation.

32. A method of protecting an electronic circuit against radiation, comprising the steps of:
detecting that the threshold voltage of a semiconductor element is shifted, in a positive direction, to a predetermined upper limit on the basis of the formation of a trap level at an interface within the semiconductor element due to radiation; and
controlling the number of trapped positive charges in the semiconductor element, upon detecting the arrival of the threshold voltage to the predetermined upper limit so that the threshold value is shifted, in a negative direction, to a value less than the predetermined upper limit.

33. A method according to claim 32, wherein the step of controlling the number of trapped positive charges is a step of controlling and decreasing the thickness of a shield which is used for shielding the semiconductor element from radiation.

34. A method according to claim 32, wherein the detecting step is effected by means for directly detecting said threshold voltage.

35. A method according to claim 32, wherein the detecting step is effected by means for previously calculating a time to reach said predetermined upper limit as an estimated value.

36. An apparatus for protecting an electronic circuit against radiation, comprising means for estimating a threshold voltage change, and means for restricting the generation of the number of trapped positive charges in a semiconductor element due to radiation, or the reduction of said number of trapped positive charges.

* * * * *